Oct. 10, 1939.　　　　F. C. BEST　　　　2,175,374
MOTOR VEHICLE
Filed Feb. 17, 1936　　　2 Sheets-Sheet 1
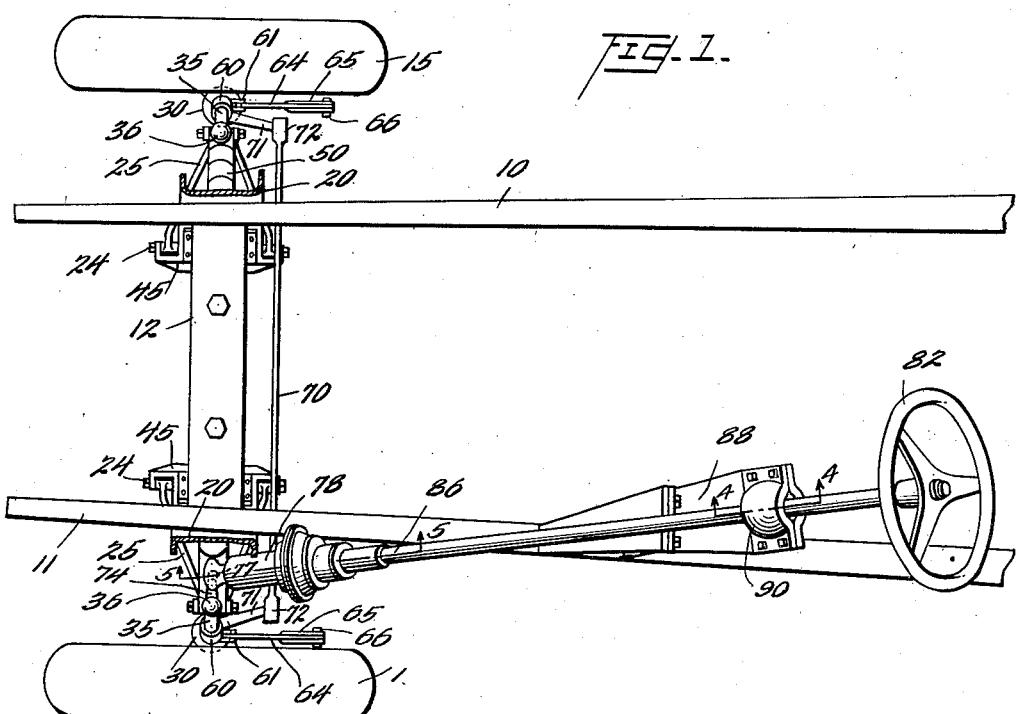
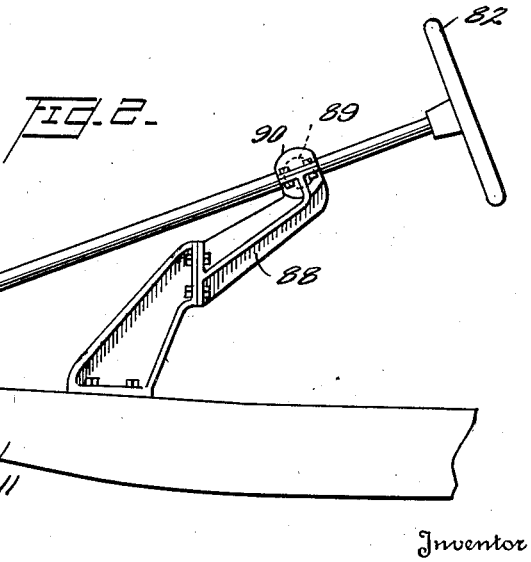
Inventor
Frank C. Best
By Watson, Coit, Morse & Grindle
Attorneys Oct. 10, 1939.    F. C. BEST    2,175,374
MOTOR VEHICLE
Filed Feb. 17, 1936.    2 Sheets-Sheet 2
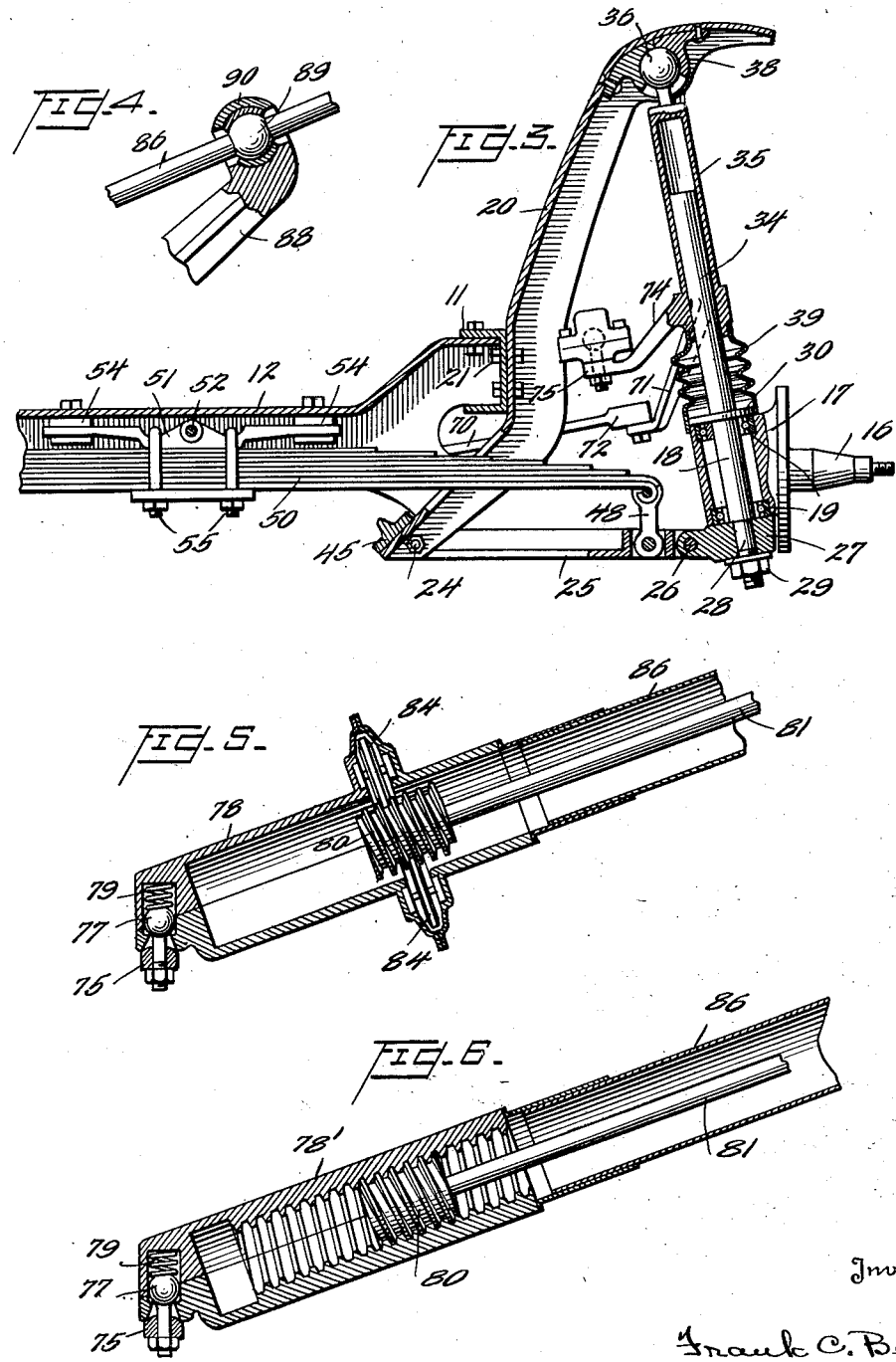

Patented Oct. 10, 1939

2,175,374

UNITED STATES PATENT OFFICE 2,175,374

MOTOR VEHICLE

Frank C. Best, Detroit, Mich., assignor to Packard Motor Car Company, Detroit, Mich., a corporation of Michigan Application February 17, 1936, Serial No. 64,394

3 Claims. (Cl. 280—96)

This invention relates to steering apparatus for motor vehicles and has for its principal object the provision of a steering mechanism of simplified construction in which the number of moving elements and the joints or other connections therebetween are reduced to a minimum. It is a feature of the invention that the conventional drag links may be entirely eliminated by the establishment of a direct geared connection between the usual steering shaft which carries the steering hand wheel and the steering arm of the wheel assembly.

Thus in the preferred form of the invention the steering shaft is provided with cam means cooperating with a cam follower, the latter being directly connected to the steering arm. The steering shaft is supported within the usual housing which also affords a support for the cam follower; for example, the follower may comprise a member slidable in or on the housing so as to telescope therewith. By mounting the steering shaft housing in a pivotal support on the vehicle frame, the housing and steering shaft are permitted to swing to conform to the arcuate movement of which the steering arm partakes.

By reason of the direct nature of the connection between the steering hand wheel and the road wheel assembly, and the consequent elimination of a number of the articulated connections which characterize conventional steering linkage, the amount of play in the steering mechanism may be materially reduced and the tendency of the road wheels to shimmy may accordingly be minimized. Again, by the reduction of the number of jointed connections in the steering mechanism, the total amount of friction developed therein may be materially reduced with consequent improvement in ease of steering.

Other objects and features of the invention will be apparent from the following description taken in connection with the accompanying drawings, in which Figure 1 is a plan view of a portion of a vehicle frame illustrating the application of the invention to a form of wheel suspension of the independent type;

Figure 2 is a side elevation of the construction shown in Figure 1;

Figure 3 is an enlarged transverse sectional view of the wheel suspension illustrating the mode of connection of the steering mechanism to the road wheel assembly;

Figure 4 is a fragmentary sectional view taken substantially on the line 4—4 of Figure 1;

Figure 5 is a fragmentary sectional view of the lower end of the steering housing taken substantially on the line 5—5 of Figure 1; and Figure 6 is a view corresponding to Figure 5 and illustrating a modified form of gearing.

While it will be appreciated that various features of the invention are useful with widely different types of wheel suspension, the steering mechanism disclosed and claimed herein is particularly applicable to a form of wheel suspension employing a steering arm which is connected to the wheel assembly for rotation therewith about the axis of steering movement of the road wheel but which does not partake of rising and falling movement with the road wheel to any substantial extent. One form of wheel suspension of this character is disclosed in my prior U. S. Letters Patent 2,018,653, granted October 29, 1935. The details of this wheel suspension are not specifically claimed herein, but form the subject matter of the claims in my prior patent. It will therefore be understood that the invention claimed herein is not limited in respect of such details, although the wheel suspension is fully described in order to facilitate an understanding of the preferred mode of employment of the present invention.

It will be observed that the supporting frame of the vehicle is illustrated conventionally as comprising the side frame members 10 and 11 and the cross frame member 12, the latter extending between and being rigidly secured to the side frame members in the usual manner. The road wheels 15 are carried on wheel spindles 16 which are in turn rigid with steering knuckles 17, each of the steering knuckles being supported for rising and falling movement as well as for steering movement in a substantially horizontal plane. Thus each knuckle may be supported on a shaft 18, preferably by anti-friction bearings 19, the shaft 18 performing the function of the usual king pin. For convenience the axis about which the road wheels are swung to effect steering of the vehicle is hereinafter described as substantially vertical; it will nevertheless be understood that the shaft 18 will ordinarily be inclined to the vertical, this being necessary to provide the usual wheel camber and to properly control the movement of the wheels in rising and falling as will be explained.

Each side frame member 10 carries a fender brace 20, bolted or otherwise secured to the frame as at 21, the brace 20 depending beneath the side frame member to afford a pivotal support as at 24 for the wheel supporting link 25, the latter being also pivotally connected as at 26 to a sleeve 27 surrounding a reduced portion 28 of the shaft 18, the sleeve being retained in position by means of a nut 29 threaded on the lower end of the shaft. The shaft 18 is provided with an annular flange or collar 30 engaging the uppermost of the antifriction bearings 19 and the sleeve 27 engages the lower bearing 19, thus confining the shaft 18 within the knuckle against endwise displacement but permitting free rotation of the knuckle on the shaft.

The upper portion 34 of the shaft 18 is substantially cylindrical and is telescoped within a cylindrical sleeve 35, the latter being formed at its upper end to afford a universal connection with the fender brace 20, this connection preferably comprising a spherical head 36 which is received within a complementary split socket 38, the latter being secured to the fender brace 20. During operation of the vehicle the shaft 18 and the sleeve 35 partake of relative sliding movement and it is therefore desirable to supply lubricant to these parts, an extensible boot 39 of flexible material surrounding the exposed portion of the shaft 18 and being secured to the lower end of the sleeve 35 and to the knuckle 17. The lever 25 is formed with inwardly divergent arms which are supported for pivotal movement about the common axis 24. A yoke-shaped reinforcing member 45 extends about the brace 20 and the inner ends of the arms of the lever to add strength to the construction, the bolts 24 passing through the member 45, the side flanges of the brace 20, and the arms respectively. Thus longitudinal and rotative stresses such as occur when the brakes are applied are effectively carried from the road wheel to the vehicle frame.

The movement executed by the road wheel in passing over an irregular bed will be apparent. As either road wheel rises, the portion 34 of the associated shaft 18 will move upwardly within the complementary sleeve 35 and the lower end of the shaft 18 will be guided during this movement by the link 25 which is pivotally connected at its opposite ends to the vehicle frame and to the road wheel assembly respectively. It will be observed that in the normal position occupied by the several parts of the wheel suspension, in which they are shown in Figure 3, the link 25 is nearly perpendicular to the shaft 18, the point of pivotal connection 26 between the link and the sleeve 27 being slightly below a line passing through the pivotal axis 24 and lying at a right angle to the shaft 18. Thus the lower end of the shaft 18 and the associated steering knuckle will be displaced laterally of the frame to a very slight extent only as the road wheel rises and falls and the shaft 18 and the associated sleeve 35 will therefore partake of swinging movement of relatively small amplitude about the spherical connection 36, 38, there being no material variation of the camber of the wheel. Again, as the wheel rises, the link 25 will approach a position perpendicular to the shaft 18 and thus the latter tends to move outwardly to a small extent, this outward movement of the wheel and the very small change in camber which it produces compensating for the inward movement of the wheel resulting from the inclination of the shaft 18, the net result being that there is no appreciable variation in the tread of the road wheels and unnecessary wear on the tire is consequently avoided.

The upward movement of either road wheel is resisted by a transversely extending leaf spring 50 which is carried by the cross frame member 12 adjacent the mid point of the latter. Each end of the leaf spring 50 is connected by means of a shackle member 48 to the associated wheel supporting link 25 as shown more particularly in Figure 3, it being observed that this connection permits slight relative longitudinal displacement of the spring and the link.

The connection between the leaf spring 50 and the frame is preferably of such a nature as to prevent the transmission of synchronous vibrations between the wheels or between either wheel and the frame through the spring and may comprise a lever 51 pivoted as at 52 to the cross frame member for slight rocking movement about the longitudinal axis. The two arms of the lever 51 are yieldingly connected to the frame through rubber blocks 54. The usual shackle bolts 55 secure the spring to the lever 51, and it will thus be observed that any vibration induced in the spring such as would promote a rocking movement of the lever 51 is effectually damped by the resultant compression and expansion of the rubber blocks, the energy of vibration being dissipated in the form of heat. The damping of synchronous vibrations in this manner tends to eliminate shimmy in the wheels.

Referring now to Figure 2 of the drawings, it will be observed that the sleeve 35 is provided adjacent its lower end with a collar 60 from which an ear 61 extends rearwardly, a rearwardly extending ear 62 being also formed on the steering knuckle 17. Links 64 and 65, pivoted to each other at 66 and to the ears 61 and 62 respectively serve to connect the sleeve 35 and the knuckle 17 for unitary rotation, at the same time permitting the sleeve 35 and the knuckle 17 free relative movement in an axial direction. It will be observed that this construction is the equivalent of a keyed connection between the portion 34 of the shaft and the sleeve 35 but is somewhat simpler, sturdier, and more readily accessible for repair.

The sleeves 35 at opposite sides of the vehicle are connected by means of a cross tie rod 70, the latter being pivotally connected at its ends as at 72 in the conventional manner to steering knuckle arms 71 formed integrally with or secured to each of the sleeves 35. The sleeve 35 at the left-hand side of the vehicle is provided with a further arm 74 which is operable by steering mechanism about to be described.

It will be apparent that the arm 74 may be rotated about the axis of the shaft 18, the end 75 of this arm moving forwardly and rearwardly in a substantially horizontal plane. When the arm 74 is thus moved, and the sleeve 35 rotated, the steering knuckle 17 is similarly rotated through the links 64 and 65 and the associated road wheel is caused to execute a steering movement. A similar steering movement is executed by the road wheel at the right-hand side of the vehicle by reason of the connection between the two road wheel assemblies comprising the cross tie rod 70 and the arms 71. It will be particularly observed that there is no rising and falling movement of either of the arms 71 and 74 since the sleeves 35 do not rise and fall with the road wheels. For this reason it is possible to secure optimum results with the simplified form of steering mechanism illustrated herein.

Thus a universal joint connection of conventional type may be employed between the inner end 75 of the arm 74 and a steering member 76, this connection being indicated at 77, a coil spring 79 acting between the relatively movable parts of the connection to prevent rattling. In Figure 5 of the drawings the member 76 constitutes in effect the nut of a screw and nut gearing, the associated threaded member 80 being carried by the lower end of the steering shaft 81, the usual steering hand wheel 82 being secured to the upper end of this shaft. The member 78 is formed as a housing slidable on and telescoping with the steering shaft housing 86, and is provided with a plurality of rollers 84, the periphery of these rollers engaging in the threads of the member 80 and being journalled for rotation in the member 78 about axes slightly inclined with respect to the axis of the member 80 in the direction of the threads. It will be understood that each of the rollers 84 is bevelled adjacent its periphery so as to mesh with a fair degree of accuracy with the threaded portion of the member 80 so that backlash in the gearing may be substantially eliminated and friction minimized. The steering shaft housing 86 surrounds the steering shaft 81 and extends between the hand wheel 82 and the member 78 and cooperates with the latter to completely enclose the steering shaft and the gearing, the latter being packed with lubricant as is customary. A bracket 88 is formed at its upper end to receive a substantially spherical collar 89 fitted on the steering shaft housing 86, the assembly being completed by means of a cap 90 secured to the bracket at its upper end, whereby a spherical joint is effected between the vehicle frame and the housing, permitting the latter to rock but retaining the same against longitudinal displacement.

As the steering hand wheel 82 is rotated, the member 78 which forms the nut of the screw and nut gearing hereinbefore referred to will be moved generally longitudinally of the vehicle, thus rocking the arm 74 and effecting steering movement of the road wheels as hereinbefore explained. Owing to the fact that the end 75 of the arm 74 does not move in a path precisely longitudinally of the steering housing, some slight rocking movement of the latter must be permitted. The ball and socket joint between the steering shaft housing 86 and the bracket 88 is provided for this purpose.

In the form of the invention shown in Figure 6 of the drawings, the construction is quite similar to that illustrated in Figure 5 and similar reference characters are employed to designate like parts. In lieu of the anti-friction nut disclosed in Figure 5, a simpler form of nut is illustrated at 78', comprising a tubular housing which is threaded on the interior thereof to cooperate with the threaded member 80 at the lower end of the steering shaft 81.

While the employment of gearing of the screw and nut type is preferred, it is not essential to proper operation of the steering mechanism. In general, any connection of the cam and follower type may be employed. Various modifications of the arrangement shown herein will readily occur to one skilled in the art to which the invention relates, and no limitation of the scope of the invention is contemplated except as defined in the appended claims.

Having thus described the invention, what is claimed as new and desired to be secured by Letters Patent is:

1. In a motor vehicle having a frame, a steerable road wheel supported on said frame for rising and falling movement with respect to said frame, a supporting spindle for said wheel, and a steering arm disposed adjacent said spindle and laterally of said road wheel, said arm partaking of steering movement only with said road wheel, the combination with a steering shaft supported on said frame and having the lower end thereof disposed laterally of the road wheel and adjacent said spindle, of a hand wheel secured to the upper end of said shaft, and a pair of cooperating gear elements connected directly to said steering arm and said shaft respectively.

2. In a motor vehicle having a frame, a steerable road wheel supported on said frame for rising and falling movement with respect to said frame, a supporting spindle for said wheel, and a steering arm disposed adjacent said spindle and laterally of said road wheel, said arm partaking of steering movement only with said road wheel, the combination with a steering shaft supported on said frame and having the lower end thereof disposed laterally of the road wheel and adjacent said spindle, of a hand wheel secured to the upper end of said shaft, and screw and nut gearing means directly connecting said steering shaft and steering arm.

3. In a motor vehicle having a frame, a steerable road wheel supported on said frame for rising and falling movement with respect to said frame, a supporting spindle for said wheel, and a steering arm disposed adjacent said spindle and laterally of said road wheel, said arm partaking of steering movement only with said road wheel, the combination with a steering shaft having the lower end thereof disposed laterally of the road wheel and adjacent said spindle, of a hand wheel secured to the upper end of said shaft, a pair of cooperating gear elements connected directly to said steering arm and said shaft respectively, a steering shaft housing supporting said shaft, and means affording a pivotal support for said housing on said frame.

FRANK C. BEST.